US012574379B2

(12) United States Patent
Rastogi et al.

(10) Patent No.: US 12,574,379 B2
(45) Date of Patent: Mar. 10, 2026

(54) SMART JUST-IN-TIME PRIVILEGE MANAGEMENT

(71) Applicant: Andromeda Security, Los Altos, CA (US)

(72) Inventors: Gaurav Rastogi, San Francisco, CA (US); Murali Basavaiah, Los Altos, CA (US); Kevin Alejandro Roundy, El Segundo, CA (US); Kamalakannan Congevaram Muralidharan, Milpitas, CA (US)

(73) Assignee: Andromeda Security, Los Altos, CA (US)

( * ) Notice: Subject to any disclaimer, the term of this patent is extended or adjusted under 35 U.S.C. 154(b) by 0 days.

(21) Appl. No.: 19/224,202

(22) Filed: May 30, 2025

(65) Prior Publication Data

US 2025/0385917 A1     Dec. 18, 2025

Related U.S. Application Data

(60) Provisional application No. 63/659,759, filed on Jun. 13, 2024.

(51) Int. Cl.
H04L 9/40          (2022.01)

(52) U.S. Cl.
CPC .......... H04L 63/101 (2013.01); H04L 63/102 (2013.01); H04L 63/1433 (2013.01)

(58) Field of Classification Search
CPC .. H04L 63/101; H04L 63/102; H04L 63/1433
See application file for complete search history.

(56) References Cited

U.S. PATENT DOCUMENTS

| | | | | |
|---|---|---|---|---|
| 9,648,036 | B2 * | 5/2017 | Seiver | H04L 63/1433 |
| 10,230,734 | B2 * | 3/2019 | Seigel | H04L 63/102 |
| 11,640,470 | B1 | 5/2023 | Amar | |
| 12,028,346 | B1 * | 7/2024 | Cannard | H04L 63/102 |
| 12,058,142 | B2 * | 8/2024 | Kumar | H04L 63/101 |
| 2016/0323288 | A1 * | 11/2016 | Peterson | H04L 63/102 |
| 2018/0033006 | A1 * | 2/2018 | Goldman | G06F 21/6218 |
| 2019/0207953 | A1 * | 7/2019 | Klawe | G06F 21/57 |
| 2021/0126912 | A1 * | 4/2021 | Maclean | H04W 12/065 |
| 2021/0150023 | A1 * | 5/2021 | Juncker | H04W 12/126 |
| 2021/0234856 | A1 * | 7/2021 | Rehnelt | H04L 63/101 |
| 2021/0281610 | A1 | 9/2021 | Applegate-Swanson | |
| 2022/0060507 | A1 * | 2/2022 | Crabtree | G06F 16/2477 |
| 2022/0166762 | A1 * | 5/2022 | Srour | H04L 63/108 |
| 2023/0109755 | A1 * | 4/2023 | Qadri | H04L 63/0281 726/12 |
| 2024/0179184 | A1 * | 5/2024 | Dayan | H04L 63/102 |

(Continued)

FOREIGN PATENT DOCUMENTS

| | | | | | |
|---|---|---|---|---|---|
| CN | 110519241 | A | * 11/2019 | ......... | H04L 63/1425 |
| CN | 112543176 | A | * 3/2021 | .......... | H04L 43/028 |

(Continued)

*Primary Examiner* — Sarah Su

(74) *Attorney, Agent, or Firm* — Van Pelt, Yi & James LLP

(57)          ABSTRACT

A just-in-time (JIT) elevated privilege access request associated with a user is analyzed including by using a plurality of factors associated with an impact of approving the request. It is determined whether to approve the request based on the analysis. A JIT session with elevated privileges is provisioned based on the determination.

82 Claims, 4 Drawing Sheets

(56) References Cited

U.S. PATENT DOCUMENTS

| 2025/0126145 | A1 |   | 4/2025 | Sapir |   |
| 2025/0202899 | A1 | * | 6/2025 | Chen | H04L 63/102 |
| 2025/0202910 | A1 | * | 6/2025 | Kondapi | H04L 63/1416 |

FOREIGN PATENT DOCUMENTS

| CN |   | 120200863 | A | * | 6/2025 | H04L 9/40 |
| EP |   | 3571619 | B1 | * | 5/2021 | G06F 9/45504 |
| WO | WO-0111452 | A2 | * | 2/2001 | G06F 21/41 |
| WO | WO-2016067117 | A1 | * | 5/2016 | G06F 21/316 |

* cited by examiner

100

Figure 2:
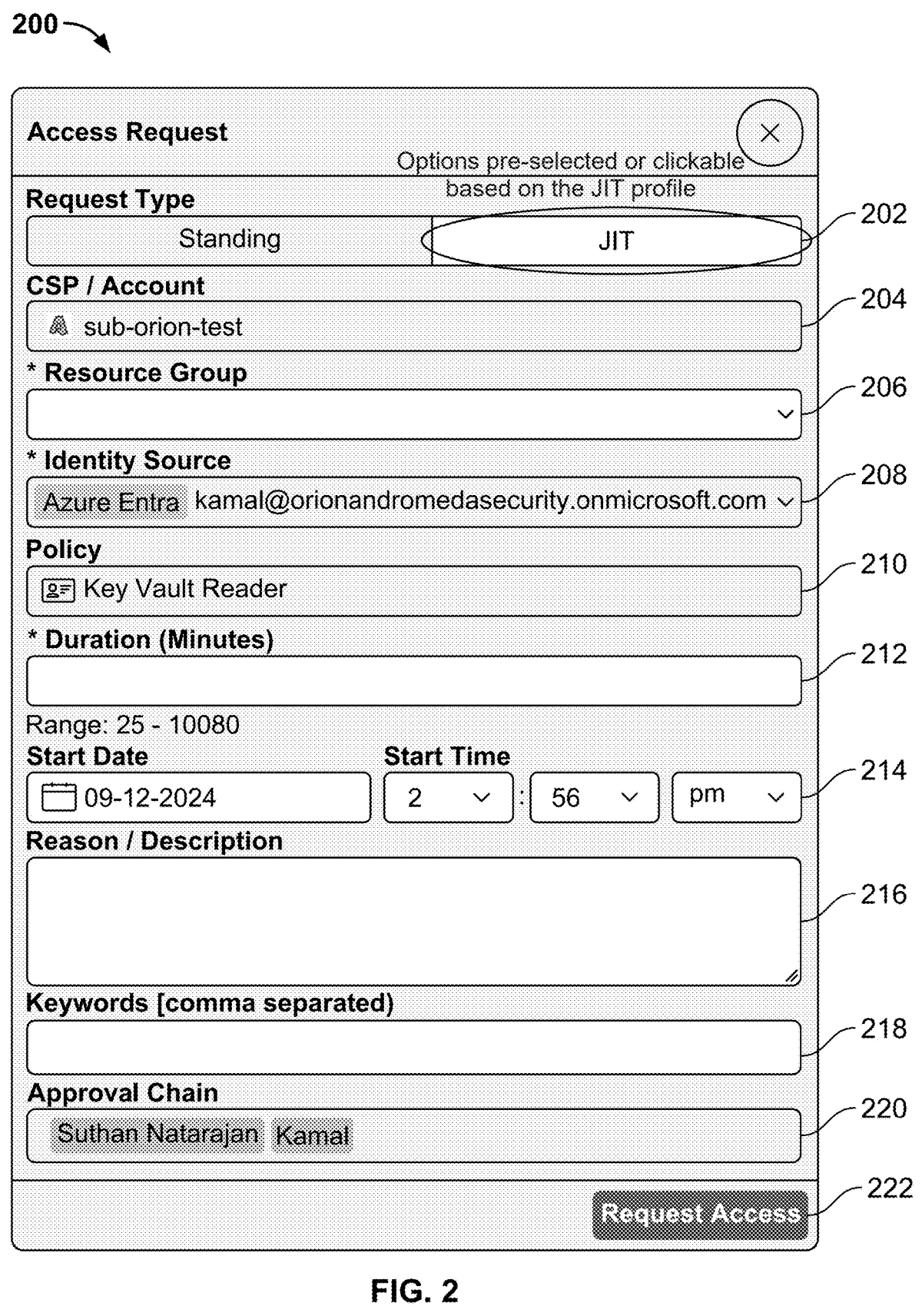

200

Access Request                                                 ⊗

Options pre-selected or clickable
based on the JIT profile

Request Type                                                           — 202

| Standing | JIT |
|----------|-----|

CSP / Account                                                          — 204

🔺 sub-orion-test

**\* Resource Group**                                                      — 206

[                                                          ⌄]

**\* Identity Source**                                                     — 208

Azure Entra  kamal@orionandromedasecurity.onmicrosoft.com  ⌄

Policy                                                                 — 210

🪪 Key Vault Reader

**\* Duration (Minutes)**                                                  — 212

[                                                           ]

Range: 25 - 10080

Start Date                    Start Time                           — 214

📅 09-12-2024          [2  ⌄] : [56  ⌄]  [pm  ⌄]

Reason / Description                                                   — 216

[                                                           ]

Keywords [comma separated]                                             — 218

[                                                           ]

Approval Chain                                                         — 220

Suthan Natarajan  Kamal

Request Access                                                         — 222

Ingest JIT session logs          402

Analyze logs for anomalies and security events          404

Generate human-readable summary of session activity          406

Provide alerts, findings, and human-readable summary of session activity          408

SMART JUST-IN-TIME PRIVILEGE MANAGEMENT

CROSS REFERENCE TO OTHER APPLICATIONS

This application claims priority to U.S. Provisional Patent Application No. 63/659,759 entitled SMART JUST-IN-TIME PRIVILEGE MANAGEMENT filed Jun. 13, 2024 which is incorporated herein by reference for all purposes.

BACKGROUND OF THE INVENTION

A privileged access gives users the ability to perform tasks which they cannot perform unless they have those privileges. These requests are made by the user by requesting a privilege policy that contains a group of permissions that are required to perform a group of tasks in cloud infrastructure or applications. When a user makes such a privileged request, they need to provide a reason for the request and current systems will evaluate the appropriate reviewer and route the request accordingly. The request is manually reviewed by the human reviewer, who must perform an additional task of understanding the details of the request and deciding whether to approve or deny. Typically, the reviews can take several days to several weeks as they are very burdensome for the reviewers as it puts an onus on them to perform the analysis manually for every request. Once the request is approved the analysis of the activities performed during the elevated privilege session is not performed by the reviewers.

BRIEF DESCRIPTION OF THE DRAWINGS

Various embodiments of the invention are disclosed in the following detailed description and the accompanying drawings.

FIG. 2 provides an example of a form for requesting elevated privilege access.

DETAILED DESCRIPTION

Figure 1:
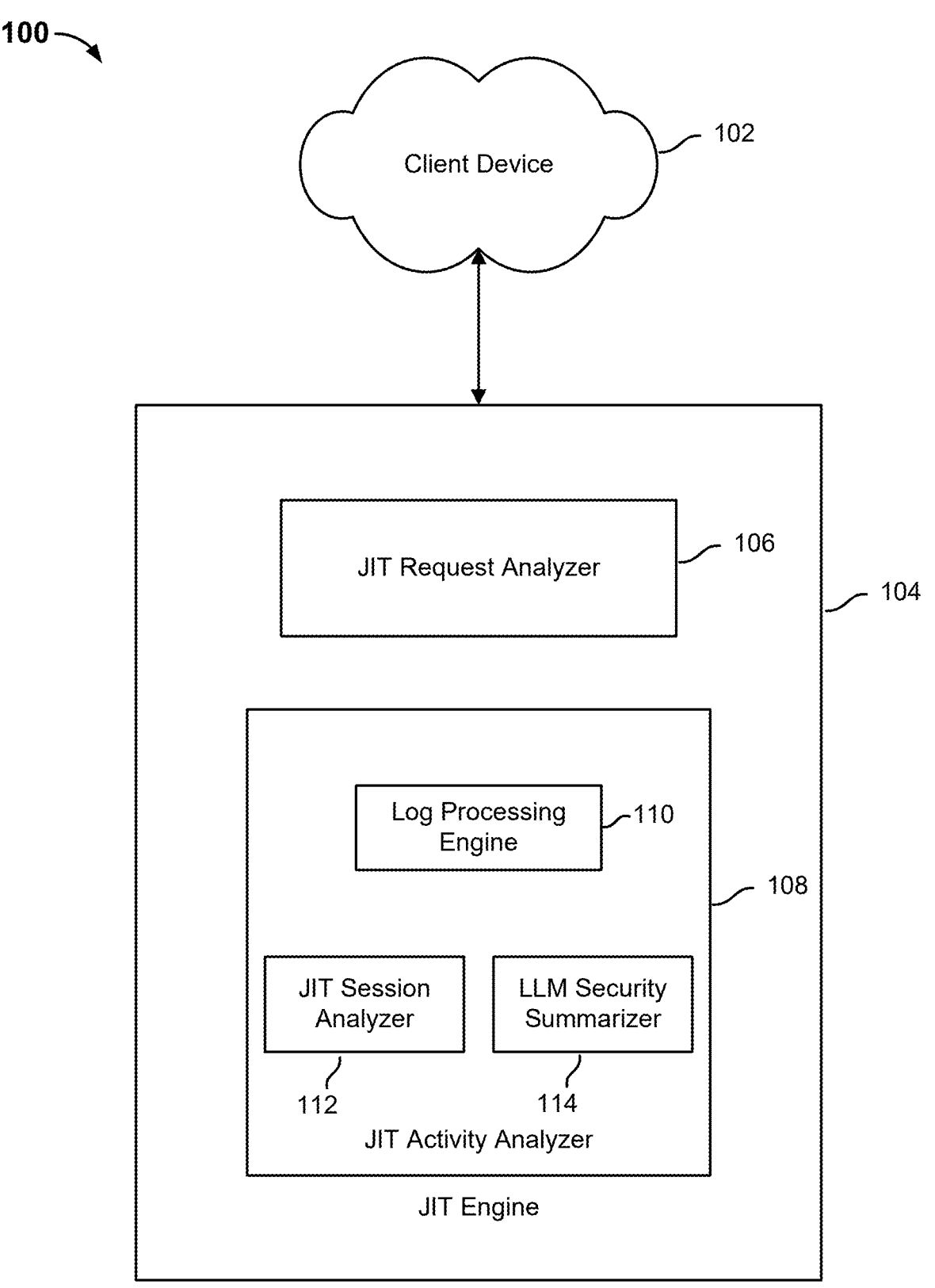
FIG. 1 is a block diagram illustrating a system to implement a smart just-in-time privilege management engine in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to implement a smart just-in-time (JIT) request engine are disclosed herein. The current JIT privilege solutions rely on the human reviewers to understand, analyze and review every request. That results in the following limitations:

1. The time it takes to get a request approved is very long (i.e., days to weeks). This may cause security gaps or unauthorized access because users might seek workarounds to bypass the JIT system entirely to get their job done.
2. The reviews are made using basic information that is put into the request, like the name of the policy, the requester, and the account. The reviews are made without determining the impact of approving such a request. A user could unintentionally be given access to critical systems, sensitive data, or destructive administrative rights, which could lead to data loss, service outages, or compliance violations.
3. The analysis of the elevated privileged session is not captured and reported back to the privileged session. As a result, there is no visibility into what actions were performed using the elevated access.

Current systems do not provide measures of risk associated with the request or the requestor. The systems and methods disclosed herein consider measures of risk associated with the request or the requestor when approving a JIT request.

Implementing a smart JIT request engine includes receiving a JIT request from a user. The JIT request may be provided as an access request form via an application programming interface (API) call, a user interface, a notification (e.g., Slack message), an email or ticketing system, a command line tool, a mobile application, etc. In some embodiments, the access request form includes input fields for the request type, the account requesting access, the resource group for which access is being requested, the identity source, the duration of the requested JIT session with elevated permissions, the start date and time of the JIT session, the reason for/description of the request and why elevated privilege is needed, associated keywords, and the approval chain.

The JIT request engine is further configured to automatically approve or deny the JIT request by analyzing a plurality of factors associated with the impact of approving the request such as user risk models including the privilege's blast risk, the requester's security posture risk, and/or behavior risk. The factors used to analyze the request may further include a geo model, a behavior probability model, the user's privilege history, the user's peer privilege history, and/or the output of a custom rules engine.

In response to determining that the JIT request should not be automatically approved, a manual review is requested. The JIT request engine provides the manual reviewer with the contextual information used in the initial automated review, including the user risk models, the geo model, the behavior probability model, the user's privilege history, the user's peer privilege history, and/or the output of a custom rules engine. If the request is not approved by manual review, the user is notified of the denied request. The notification may include a reason for denying the request.

In response to determining that the request should be approved, whether automatically by the JIT request engine or by manual review, a JIT session with elevated privileges is automatically provisioned by the JIT request engine. Provisioning the JIT session with elevated privileges may include assigning roles or policies. Provisioning the JIT session may further include adding or modifying permissions in accordance with the JIT request. In some embodiments, provisioning the JIT session with elevated privileges is specific to the privilege management system used by the user's cloud provider, such as cloud provider 102 (i.e., provisioning a JIT session on AWS IAM may include different steps from provisioning a JIT session on Azure Active Directory). In some embodiments, provisioning the JIT session includes communicating with the user's cloud provider through an application programming interface (API).

During the JIT session, a JIT activity analyzer is configured to analyze user activity with the privileged access. Analyzing user activity during the JIT session may include ingesting session logs, analyzing the logs for anomalies and security events, generating a human-readable summary of session activity, and providing alerts, findings, and the human-readable summary of session activity to a security administrator. In some embodiments, providing the alerts, findings, and human-readable summary further includes providing the alerts, findings, and human-readable summary to a JIT request analyzer to be included in its risk-assessment for future access requests.

Using the systems and methods to implement a smart JIT request engine as disclosed herein minimizes the time to approve a JIT privilege access request by automating the approval process, significantly expanding the amount of contextual information provided to a manual reviewer if manual review is required, and capturing and reporting an analysis of the actions performed using the elevated access.

FIG. 1 is a block diagram illustrating a system to implement a smart JIT privilege management engine in accordance with some embodiments. In the example shown, system 100 includes JIT engine 104 which is configured to interact with client device 102. Client device 102 may be a laptop, a desktop, a server, a virtual machine, a container, a mobile device, etc.

Client device 102 may be associated with a public cloud provider service such as Amazon Web Services, Microsoft Azure, or Google Cloud Platform, or with an application. Client device 102 includes a privilege management system (e.g., AWS IAM, Azure Active Directory, or GCP IAM) which assigns permissions to individual users. These permissions define what actions a user is allowed to perform and may be configured by a system administrator as roles, groups, or policies.

JIT engine 104 is configured to add, modify, and remove permissions associated with users of cloud environment 102.

JIT engine 104 may be implemented on one or more servers, one or more computers, one or more virtual machines, one or more containers, etc.

JIT engine 104 includes JIT request analyzer 106. At times, a user of a cloud provider such as client device 102 (or an application) may need to request elevated privilege access. For example, the user may be an on-call engineer responding to a customer bug that led to a mistaken data entry. To resolve the issue, the user needs elevated permissions which they would not normally hold to modify user data tables and delete the mistaken entry.

FIG. 2 provides an example of a form for requesting elevated privilege access in accordance with some embodiments. In the example shown, access request form 200 includes input fields for request type 202, account requesting access 204, resource group for which access is being requested 206, identity source (i.e., the user requesting access) 208, policy requested 210, duration of the requested JIT session with elevated permissions 212, start date and time of the JIT session 214, reason for/description of the request and why elevated privilege is needed 216, associated keywords 218, and approval chain 220. Once the user submits the form by clicking button 222, it is analyzed by JIT request analyzer 106.

JIT request analyzer 106 is configured to receive a privileged access request and automatically approve or deny the privileged access request based on a plurality of factors, such as who is requesting, what set of privileges are being requested, and how the privileged access request was made (e.g., the context of the request). The privileged access request may be received via an application programming interface (API) call, a user interface, a notification (e.g., Slack message), an email or ticketing system, a command line tool, a mobile application, etc.

JIT request analyzer 106 is configured to approve or deny the privileged access request based on corresponding outputs associated with user risk models, a geo model, user behavior model, and a device model.

In some embodiments, the output of the user risk models is based in part on the privilege's blast risk, which measures the impact on business if the requestor's account is compromised while the requester has privileged access. In some embodiments, the output of the user risk models is based in part on the requester's security posture risk, which measures the likelihood that a requester could be compromised. Examples of identities that have a bad posture risk include an identity that represents an employee who has been terminated, an identity for which multi-factor authentication is not enabled, and an identity with a weak or exposed password. The posture risk's value includes attributes such as stale users (e.g., user is in the system, but not in the HR system), MFA risk, key hygiene, etc. In some embodiments, the output of the user risk models is based in part on a behavior risk metric that can measure how likely it is that an account is currently compromised. Behavior risk may be represented by sequences of anomalous events, but also by unusual event metadata indicating such things as access to an account from an unexpected location or device, or at an irregular time or at irregular volume.

In some embodiments, the output of the geo model is based in part on context information, such as prior geo location and network location of the requester to build a normal known geo location for the identity. In some embodiments, JIT request analyzer 106 uses a combination of identities of known locations with the other well-known locations of all the identities in the tenant to determine the known locations. In some embodiments, the geo model automatically addresses the false positives due to the VPN network as VPN IP addresses even though they are not publicly mapped to the external geographic location. All the VPN IP addresses are automatically learned across different identities in the tenant and used for tracking normal network locations. In some embodiments, the geo model determines any impossible travel that has happened in the past N days as opposed to only looking at the impossible travel at the time of the JIT request.

In some embodiments, the output of the user behavior model is based on a probability model to assess whether a user's behavior is normal or anomalous. To do so, the model analyzes a sequence of events using the context (i.e., identity, group, policy, and/or account information) as well as details such as time range, user identifiers, IP address, and/or geographical area to group the events. The user behavior model can then evaluate how probable a sequence of events associated with a user is and provide a confidence interval associated with the evaluation. This probability information may be included in assessing the risk of a JIT access request.

In some embodiments, the output of the device model is based on an evaluation of an identity associated with client device 102. If a user is making a JIT request from a new device or a device not previously known, then the request is not automatically approved.

JIT request analyzer 106 is also configured to approve or deny the privileged access request based on the user's privilege history, the user's peer privilege history, and/or an output of a custom rules engine.

In some embodiments, JIT request analyzer 106 uses context information, such as the requester's past privilege policy and permission usage to create a privilege request model. In some embodiments, JIT request analyzer 106 uses policy duration, resources used etc. as features into the privilege request model. In some embodiments, the JIT request analyzer 106 uses prior policy usage like assumed role to build history for the permission's policy usage even when the JIT request analyzer is not deployed, to shorten the time for training the underlying AI model.

In some embodiments, JIT request analyzer 106 combines the behavior of the identity's peers to determine the normal behavior of the group as input into the request analysis. In some embodiments, JIT request analyzer 106 determines the peers based on HR data like manager organization, business units etc. In some embodiments, JIT request analyzer 106 determines the peers as the set of groups who have access to a privilege policy in an account and a given identity is also a member of. This is a true representation of "peers" as members who are allowed to have similar privileges vs simply using HR or department level peers.

In some embodiments, JIT request analyzer 106 uses the output of a custom rules engine. The custom rules engine may be configured by a developer or a security administrator. In some embodiments, the custom rules engine includes specific requirements for approving or denying the JIT request which are not included in the evaluation of the user risk models, the geo model, the behavior probability model, the user's privilege history, or the user's peer privilege history.

In some embodiments, JIT request analyzer 106 creates an aggregate (ensemble) model to eliminate false positives.

In some embodiments, JIT request analyzer 106 approves the request. In some embodiments, JIT request analyzer 106 denies the request. In some embodiments, JIT request analyzer 106 determines that the JIT request needs further review. In some embodiments, if the request for elevated privilege access is anomalous, the JIT request is sent for manual review by a security administrator. In most cases, the request for elevated privilege access can be automatically handled by JIT request analyzer 106. By using JIT request analyzer 106, JIT engine 104 saves both human efforts involved in the review process as well as the time it takes for privilege requests to be processed. Additionally, this process utilizes important risk information to perform analysis of the request which would not otherwise be available to a manual reviewer, allowing for more informed decisions on whether to approve or deny access requests.

JIT engine 104 further includes JIT activity analyzer 108. JIT activity analyzer 108 includes log processing engine 110. In some embodiments, log processing engine 110 uses a novel state machine to link every log that is reported as cloud activity across different roles associated with cloud provider 102 to tie back to the identity associated with the elevated JIT session. These activities are then provided to JIT session analyzer 112 as well as LLM security summarizer 114. JIT session analyzer 112 is configured to output alerts and findings based on anomalies. LLM security summarizer 114 is configured to output human-readable summaries of the overall JIT session and security events.

Normally, when a request access is manually reviewed, understanding the user's activity during the elevated privilege session requires manually parsing through a large number of logs, many of which are not relevant to the specific JIT session. JIT activity analyzer 108 is configured to continuously analyze the user's activity during the elevated privilege session in real time and provide a human-readable report with information that is relevant to a security administrator.

In some embodiments, the data captured by JIT activity analyzer 108 is provided to JIT request analyzer 106 to be included in its risk-assessment for future access requests.

Figure 3:
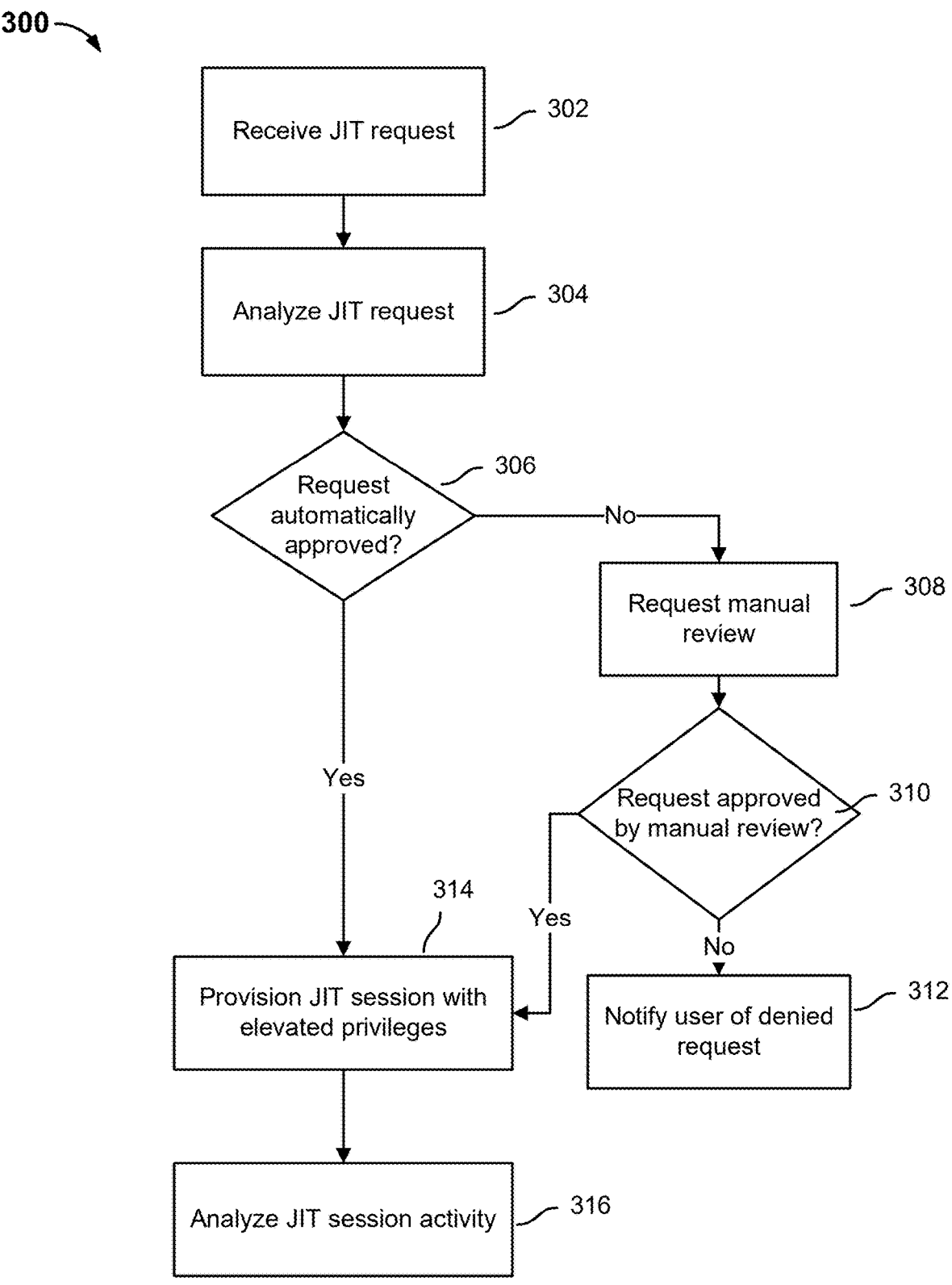
FIG. 3 is a flow diagram illustrating a process to provision a just-in-time session with elevated privileges in accordance with some embodiments.

FIG. 3 is a flow diagram illustrating a process to provision a just-in-time session with elevated privileges in accordance with some embodiments. Process 300 may be implemented by a JIT engine such as JIT engine 104.

At 302, a JIT request is received. The JIT request may be received from a user submitting an access request form such as access request form 200. In some embodiments, the JIT request may be received by an API call. In some embodiments, the JIT request includes the request type, the account requesting access, the resource group for which access is being requested, the identity source (i.e., the user requesting access), the policy requested, the duration of the requested JIT session with elevated permissions, the start date and time of the JIT session, the reason for/description of the request and why elevated privilege is needed, keywords, and the approval chain.

At 304, the JIT request is analyzed. The JIT request may be analyzed using the privilege's blast risk; the requester's posture risk; a behavior risk metric; a privilege request model based on context information such as the requester's past privilege policy, permission usage, policy duration, resources used, etc., and build history for the permission's policy usage; context information such as prior geo location and network location of the requester; VPN IP addresses; a combination of the identities of known locations with the other well-known locations of all the identities in the tenant; device model information; the behavior of the identity's peers based on HR data; and an aggregate model to eliminate false positives.

At 306, it is determined whether the request is automatically approved based on the analysis performed at step 304. In response to determining that the request should be automatically approved, process 300 proceeds to 314. In response to determining that the request should not be automatically approved, process 300 proceeds to 308.

At 308, manual review is requested. Manual review may be performed by a security administrator, a manager in the user's approval chain, or another human member of the user's organization. The manual reviewer may be provided with the JIT request information as well as any or all of the contextual and risk-related information utilized by a JIT request analyzer, such as JIT request analyzer 106, during the automatic analysis performed at step 304.

Providing the manual reviewer with the JIT request information and the contextual and risk-related information utilized by the JIT request analyzer allows the manual reviewer to examine the request and decide whether to approve or deny the elevated privilege access session based on a more holistic assessment of risk than would normally be available. Without such context, a manual review would be made without determining the impact of approving such a request. If the request is approved without determining the impact, a user could unintentionally be given access to critical systems, sensitive data, or destructive administrative rights, which could lead to data loss, service outages, or compliance violations.

At 310, it is determined whether the request is approved by the manual reviewer. In response to determining that the request is approved by the manual reviewer, process 300 proceeds to 314. In response to determining that the request is not approved by the manual reviewer, process 300 proceeds to 312. At 312, the user is notified that the request was denied.

At 314, a JIT session with elevated privileges is provisioned. In some embodiments, the JIT session is provisioned by the manual reviewer. In some embodiments, the JIT session is automatically provisioned by the JIT engine.

Provisioning the JIT session with elevated privileges may include assigning roles or policies. Provisioning the JIT session may further include adding or modifying permissions in accordance with the JIT request. In some embodiments, provisioning the JIT session with elevated privileges is specific to the privilege management system used by the user's cloud provider, such as cloud provider 102 (i.e., provisioning a JIT session on AWS IAM may include different steps from provisioning a JIT session on Azure Active Directory). In some embodiments, provisioning the JIT session includes communicating with the user's cloud provider through an application programming interface (API).

At 316, the user's activity during the JIT session is analyzed. The JIT session may be analyzed using a JIT session analyzer such as JIT session analyzer 108.

Figure 4:
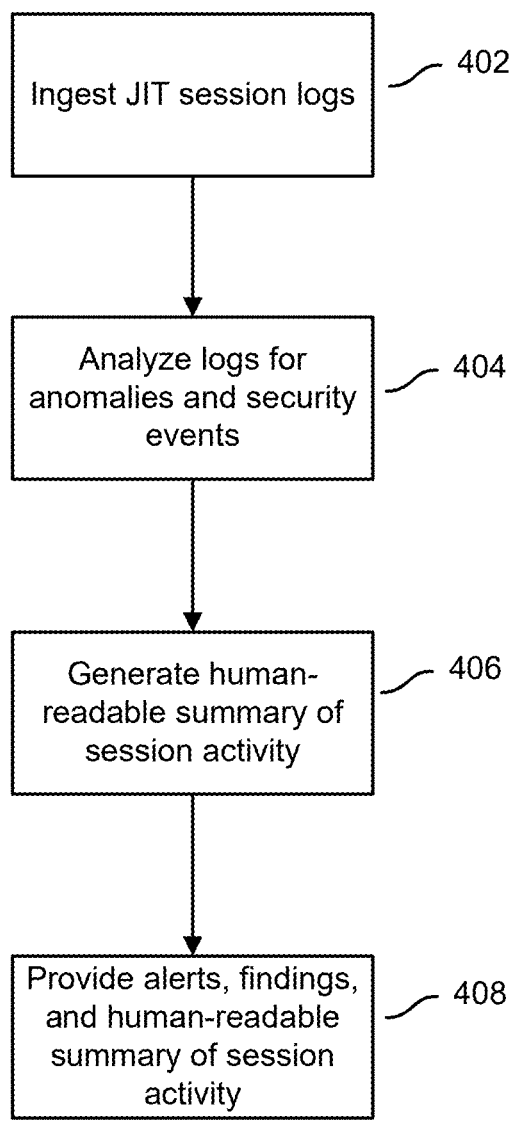
FIG. 4 is a flow diagram illustrating a process to analyze user activity during a just-in-time session with elevated privileges in accordance with some embodiments.

FIG. 4 is a flow diagram illustrating a process to analyze user activity during a just-in-time session with elevated privileges in accordance with some embodiments. In some embodiments, process 400 is implemented by a JIT activity analyzer such as JIT activity analyzer 108. Process 400 may be implemented to perform any or all of step 316 of process 300.

At 402, JIT session logs are ingested. The JIT session logs may be ingested by a log processing engine such as log processing engine 110.

At 404, the JIT session logs are analyzed for anomalies and security events. In some embodiments, analyzing the logs includes using a novel state machine to link every log that is reported as cloud activity across different roles to tie back to the identity associated with the elevated JIT session.

In this way, logs related to the specific JIT session can be identified and separated from many logs that would otherwise be difficult to review.

At 406, a human-readable summary of the JIT session activity is generated. In some embodiments, the human-readable summary is generated by an LLM security summarizer such as LLM security summarizer 114. In some embodiments, the LLM security summarizer is provided with the analyzed logs as well as a prompt with instructions to generate a human-readable summary for a security administrator. In some embodiments, the summary further includes information specific to anomalies and security events.

At 408, alerts and findings based on the anomalies and security events in the JIT session logs, as well as the human-readable summary of session activity, are provided to a security administrator or manager. In some embodiments, providing the alerts, findings, and human-readable summary further includes providing the alerts, findings, and human-readable summary to a JIT request analyzer, such as JIT request analyzer 106, to be included in its risk-assessment for future access requests.

Process 400 allows for a security administrator to easily understand a user's activity during an approved elevated privilege JIT session by reporting on only the most relevant events in a human-readable format.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
    analyze a just-in-time (JIT) elevated privilege access request associated with a user including by using a plurality of factors associated with an impact of approving the request, wherein the plurality of factors associated with the impact of approving the request includes building a normal known geo location for the user's identity based on prior geographic and network locations of the user;
    determine whether to approve the request based on the analysis; and
    provision a JIT session with elevated privileges based on the determination; and
a memory coupled to the processor and configured to provide the processor with instructions.

2. The system of claim 1, wherein the JIT session with elevated privileges is automatically provisioned in response to the determination to approve the request based on the analysis.

3. The system of claim 1, wherein in response to determining that the request should not be approved based on an automated analysis, the processor is further configured to provide a human reviewer with a request to approve the JIT elevated privilege access request.

4. The system of claim 3, wherein the processor is configured to:
    receive a response from the human reviewer; and
    provision the JIT session with elevated privileges based on the response.

5. The system of claim 4, wherein the JIT session with elevated privileges is automatically provisioned in response to the human reviewer approving the request.

6. The system of claim 4, further comprising notifying the user that the request was denied in response to the human reviewer not approving the request.

7. The system of claim 3, wherein the request includes contextual information associated with the JIT privilege access request.

8. The system of claim 1, wherein to provision the JIT session with elevated privileges, the processor is further configured to analyze the user's activity during the JIT session.

9. The system of claim 1, wherein building a normal known geo location for the user identity includes determining any impossible travel that has happened in a specified number of days.

10. A system, comprising:
   a processor configured to:
      analyze a just-in-time (JIT) elevated privilege access request associated with a user including by using a plurality of factors associated with an impact of approving the request
      determine whether to approve the request based on the analysis; and
      provision a JIT session with elevated privileges based on the determination, wherein to provision the JIT session with elevated privileges, the processor is further configured to analyze the user's activity during the JIT session, wherein to analyze the user's activity during the JIT session, the processor is configured to:
      ingest logs associated with the JIT session;
      analyze the logs for anomalies and security events;
      generate a human-readable summary of session activity by a large language model (LLM) summarizer; and
      provide alerts and findings based on the anomalies and security events as well as the human-readable summary of session activity; and
   a memory coupled to the processor and configured to provide the processor with instructions.

11. The system of claim 10, wherein to analyze the logs for anomalies and security events, the processor is configured to:
   use a novel state machine to link every log that is reported as cloud activity across different privilege roles to tie back to the user's elevated JIT session; and
   provide only the logs that are reported as cloud activity across different privilege roles to tie back to the user's elevated JIT session to an alerting system and to the LLM summarizer.

12. The system of claim 10, wherein the JIT session with elevated privileges is automatically provisioned in response to the determination to approve the request based on the analysis.

13. The system of claim 10, wherein in response to determining that the request should not be approved based on an automated analysis, the processor is further configured to provide a human reviewer with a request to approve the JIT elevated privilege access request.

14. The system of claim 13, wherein the processor is configured to:
   receive a response from the human reviewer; and
   provision the JIT session with elevated privileges based on the response.

15. The system of claim 14, wherein the JIT session with elevated privileges is automatically provisioned in response to the human reviewer approving the request.

16. The system of claim 14, further comprising notifying the user that the request was denied in response to the human reviewer not approving the request.

17. The system of claim 13, wherein the request includes contextual information associated with the JIT privilege access request.

18. The system of claim 10, wherein to provision the JIT session with elevated privileges, the processor is further configured to analyze the user's activity during the JIT session.

19. A system, comprising:
   a processor configured to:
      analyze a just-in-time (JIT) elevated privilege access request associated with a user including by using a plurality of factors associated with an impact of approving the request, wherein the plurality of factors associated with the impact of approving the request includes the user's privilege's blast risk;
      determine whether to approve the request based on the analysis; and
      provision a JIT session with elevated privileges based on the determination; and
   a memory coupled to the processor and configured to provide the processor with instructions.

20. The system of claim 19, wherein the JIT session with elevated privileges is automatically provisioned in response to the determination to approve the request based on the analysis.

21. The system of claim 19, wherein in response to determining that the request should not be approved based on an automated analysis, the processor is further configured to provide a human reviewer with a request to approve the JIT elevated privilege access request.

22. The system of claim 21, wherein the processor is configured to:
   receive a response from the human reviewer; and
   provision the JIT session with elevated privileges based on the response.

23. The system of claim 22, wherein the JIT session with elevated privileges is automatically provisioned in response to the human reviewer approving the request.

24. The system of claim 22, further comprising notifying the user that the request was denied in response to the human reviewer not approving the request.

25. The system of claim 21, wherein the request includes contextual information associated with the JIT privilege access request.

26. The system of claim 19, wherein to provision the JIT session with elevated privileges, the processor is further configured to analyze the user's activity during the JIT session.

27. A system, comprising:
   a processor configured to:
      analyze a just-in-time (JIT) elevated privilege access request associated with a user including by using a plurality of factors associated with an impact of approving the request, wherein the plurality of factors associated with the impact of approving the request includes the user's security posture risk;
      determine whether to approve the request based on the analysis; and
      provision a JIT session with elevated privileges based on the determination; and
   a memory coupled to the processor and configured to provide the processor with instructions.

28. The system of claim 27, wherein the JIT session with elevated privileges is automatically provisioned in response to the determination to approve the request based on the analysis.

29. The system of claim 27, wherein in response to determining that the request should not be approved based on an automated analysis, the processor is further configured to provide a human reviewer with a request to approve the JIT elevated privilege access request.

30. The system of claim 29, wherein the processor is configured to:

receive a response from the human reviewer; and provision the JIT session with elevated privileges based on the response.

31. The system of claim 30, wherein the JIT session with elevated privileges is automatically provisioned in response to the human reviewer approving the request.

32. The system of claim 30, further comprising notifying the user that the request was denied in response to the human reviewer not approving the request.

33. The system of claim 29, wherein the request includes contextual information associated with the JIT privilege access request.

34. The system of claim 27, wherein to provision the JIT session with elevated privileges, the processor is further configured to analyze the user's activity during the JIT session.

35. A system, comprising:

a processor configured to:

analyze a just-in-time (JIT) elevated privilege access request associated with a user including by using a plurality of factors associated with an impact of approving the request, wherein the plurality of factors associated with the impact of approving the request includes a privilege request model based on the user's past privilege policy and permission usage;

determine whether to approve the request based on the analysis; and provision a JIT session with elevated privileges based on the determination; and a memory coupled to the processor and configured to provide the processor with instructions.

36. The system of claim 35, wherein the JIT session with elevated privileges is automatically provisioned in response to the determination to approve the request based on the analysis.

37. The system of claim 35, wherein in response to determining that the request should not be approved based on an automated analysis, the processor is further configured to provide a human reviewer with a request to approve the JIT elevated privilege access request.

38. The system of claim 37, wherein the processor is configured to:

receive a response from the human reviewer; and provision the JIT session with elevated privileges based on the response.

39. The system of claim 38, wherein the JIT session with elevated privileges is automatically provisioned in response to the human reviewer approving the request.

40. The system of claim 38, further comprising notifying the user that the request was denied in response to the human reviewer not approving the request.

41. The system of claim 37, wherein the request includes contextual information associated with the JIT privilege access request.

42. The system of claim 35, wherein to provision the JIT session with elevated privileges, the processor is further configured to analyze the user's activity during the JIT session.

43. A system, comprising:

a processor configured to:

analyze a just-in-time (JIT) elevated privilege access request associated with a user including by using a plurality of factors associated with an impact of approving the request, wherein the plurality of factors associated with the impact of approving the request includes using behavior of peers associated with the user's identity to determine a normal behavior of the group, wherein the peers are the set of groups who have access to a privilege policy in an account that the user's identity is also a member of;

determine whether to approve the request based on the analysis; and provision a JIT session with elevated privileges based on the determination; and a memory coupled to the processor and configured to provide the processor with instructions.

44. The system of claim 43, wherein the JIT session with elevated privileges is automatically provisioned in response to the determination to approve the request based on the analysis.

45. The system of claim 43, wherein in response to determining that the request should not be approved based on an automated analysis, the processor is further configured to provide a human reviewer with a request to approve the JIT elevated privilege access request.

46. The system of claim 45, wherein the processor is configured to:

receive a response from the human reviewer; and provision the JIT session with elevated privileges based on the response.

47. The system of claim 46, wherein the JIT session with elevated privileges is automatically provisioned in response to the human reviewer approving the request.

48. The system of claim 46, further comprising notifying the user that the request was denied in response to the human reviewer not approving the request.

49. The system of claim 45, wherein the request includes contextual information associated with the JIT privilege access request.

50. The system of claim 43, wherein to provision the JIT session with elevated privileges, the processor is further configured to analyze the user's activity during the JIT session.

51. A system, comprising:

a processor configured to:

analyze a just-in-time (JIT) elevated privilege access request associated with a user including by using a plurality of factors associated with an impact of approving the request, wherein to analyze the request, the processor is configured to create an ensemble model which combines a plurality of inputs to the analysis to eliminate false positives;

determine whether to approve the request based on the analysis; and provision a JIT session with elevated privileges based on the determination; and a memory coupled to the processor and configured to provide the processor with instructions.

52. The system of claim 51, wherein the JIT session with elevated privileges is automatically provisioned in response to the determination to approve the request based on the analysis.

53. The system of claim 51, wherein in response to determining that the request should not be approved based on an automated analysis, the processor is further configured to provide a human reviewer with a request to approve the JIT elevated privilege access request.

54. The system of claim 53, wherein the processor is configured to:

receive a response from the human reviewer; and provision the JIT session with elevated privileges based on the response.

55. The system of claim 54, wherein the JIT session with elevated privileges is automatically provisioned in response to the human reviewer approving the request.

56. The system of claim 54, further comprising notifying the user that the request was denied in response to the human reviewer not approving the request.

57. The system of claim 53, wherein the request includes contextual information associated with the JIT privilege access request.

58. The system of claim 51, wherein to provision the JIT session with elevated privileges, the processor is further configured to analyze the user's activity during the JIT session.

59. A system, comprising:

a processor configured to:

analyze a just-in-time (JIT) elevated privilege access request associated with a user including by using a plurality of factors associated with an impact of approving the request, wherein to analyze the request, the processor is configured to build a probability model to assess whether a user's behavior is normal or anomalous and a confidence interval associated with the probability model's output, wherein the probability model is built using the plurality of factors associated with the impact of approving the request and through analyzing a sequence of events using context such as identity, group, policy, or account information as well as details such as time range, user identifiers, IP address, or geographical area to group the events;

determine whether to approve the request based on the analysis; and provision a JIT session with elevated privileges based on the determination; and a memory coupled to the processor and configured to provide the processor with instructions.

60. The system of claim 59, wherein the JIT session with elevated privileges is automatically provisioned in response to the determination to approve the request based on the analysis.

61. The system of claim 59, wherein in response to determining that the request should not be approved based on an automated analysis, the processor is further configured to provide a human reviewer with a request to approve the JIT elevated privilege access request.

62. The system of claim 61, wherein the processor is configured to:

receive a response from the human reviewer; and provision the JIT session with elevated privileges based on the response.

63. The system of claim 62, wherein the JIT session with elevated privileges is automatically provisioned in response to the human reviewer approving the request.

64. The system of claim 62, further comprising notifying the user that the request was denied in response to the human reviewer not approving the request.

65. The system of claim 61, wherein the request includes contextual information associated with the JIT privilege access request.

66. The system of claim 59, wherein to provision the JIT session with elevated privileges, the processor is further configured to analyze the user's activity during the JIT session.

67. A method, comprising:

analyzing a just-in-time (JIT) elevated privilege access request associated with a user including by using a plurality of factors associated with an impact of approving the request, wherein the plurality of factors associated with the impact of approving the request includes building a normal known geo location for the user's identity based on prior geographic and network locations of the user;

determining whether to approve the request based on the analysis; and provisioning a JIT session with elevated privileges based on the determination.

68. A computer program product embodied in a non-transitory computer readable medium and comprising computer instructions for:

analyzing a just-in-time (JIT) elevated privilege access request associated with a user including by using a plurality of factors associated with an impact of approving the request, wherein the plurality of factors associated with the impact of approving the request includes building a normal known geo location for the user's identity based on prior geographic and network locations of the user;

determining whether to approve the request based on the analysis; and provisioning a JIT session with elevated privileges based on the determination.

69. A method, comprising:

analyzing a just-in-time (JIT) elevated privilege access request associated with a user including by using a plurality of factors associated with an impact of approving the request;

determining whether to approve the request based on the analysis; and provisioning a JIT session with elevated privileges based on the determination, wherein provisioning the JIT session with elevated privileges includes analyzing the user's activity during the JIT session, wherein analyzing the user's activity during the JIT session includes:

ingesting logs associated with the JIT session;

analyzing the logs for anomalies and security events;

generating a human-readable summary of session activity by a large language model (LLM) summarizer; and providing alerts and findings based on the anomalies and security events as well as the human-readable summary of session activity.

70. A computer program product embodied in a non-transitory computer readable medium and comprising computer instructions for:

analyzing a just-in-time (JIT) elevated privilege access request associated with a user including by using a plurality of factors associated with an impact of approving the request;

determining whether to approve the request based on the analysis; and provisioning a JIT session with elevated privileges based on the determination, wherein provisioning the JIT session with elevated privileges includes analyzing the user's activity during the JIT session, wherein analyzing the user's activity during the JIT session includes:

ingesting logs associated with the JIT session;

analyzing the logs for anomalies and security events;

generating a human-readable summary of session activity by a large language model (LLM) summarizer; and providing alerts and findings based on the anomalies and security events as well as the human-readable summary of session activity.

71. A method, comprising:

analyzing a just-in-time (JIT) elevated privilege access request associated with a user including by using a plurality of factors associated with an impact of approving the request, wherein the plurality of factors associated with the impact of approving the request includes the user's privilege's blast risk;

determining whether to approve the request based on the analysis; and provisioning a JIT session with elevated privileges based on the determination.

72. A computer program product embodied in a non-transitory computer readable medium and comprising computer instructions for:

analyzing a just-in-time (JIT) elevated privilege access request associated with a user including by using a plurality of factors associated with an impact of approving the request, wherein the plurality of factors associated with the impact of approving the request includes the user's privilege's blast risk;

determining whether to approve the request based on the analysis; and provisioning a JIT session with elevated privileges based on the determination.

73. A method, comprising:

analyzing a just-in-time (JIT) elevated privilege access request associated with a user including by using a plurality of factors associated with an impact of approving the request, wherein the plurality of factors associated with the impact of approving the request includes the user's security posture risk;

determining whether to approve the request based on the analysis; and provisioning a JIT session with elevated privileges based on the determination.

74. A computer program product embodied in a non-transitory computer readable medium and comprising computer instructions for:

analyzing a just-in-time (JIT) elevated privilege access request associated with a user including by using a plurality of factors associated with an impact of approving the request, wherein the plurality of factors associated with the impact of approving the request includes the user's security posture risk;

determining whether to approve the request based on the analysis; and provisioning a JIT session with elevated privileges based on the determination.

75. A method, comprising:

analyzing a just-in-time (JIT) elevated privilege access request associated with a user including by using a plurality of factors associated with an impact of approving the request, wherein the plurality of factors associated with the impact of approving the request includes a privilege request model based on the user's past privilege policy and permission usage;

determining whether to approve the request based on the analysis; and provisioning a JIT session with elevated privileges based on the determination.

76. A computer program product embodied in a non-transitory computer readable medium and comprising computer instructions for:

analyzing a just-in-time (JIT) elevated privilege access request associated with a user including by using a plurality of factors associated with an impact of approving the request, wherein the plurality of factors associated with the impact of approving the request includes a privilege request model based on the user's past privilege policy and permission usage;

determining whether to approve the request based on the analysis; and provisioning a JIT session with elevated privileges based on the determination.

77. A method, comprising:

analyzing a just-in-time (JIT) elevated privilege access request associated with a user including by using a plurality of factors associated with an impact of approving the request, wherein the plurality of factors associated with the impact of approving the request includes using behavior of peers associated with the user's identity to determine a normal behavior of the group, wherein the peers are the set of groups who have access to a privilege policy in an account that the user's identity is also a member of;

determining whether to approve the request based on the analysis; and provisioning a JIT session with elevated privileges based on the determination.

78. A computer program product embodied in a non-transitory computer readable medium and comprising computer instructions for:

analyzing a just-in-time (JIT) elevated privilege access request associated with a user including by using a plurality of factors associated with an impact of approving the request, wherein the plurality of factors associated with the impact of approving the request includes using behavior of peers associated with the user's identity to determine a normal behavior of the group, wherein the peers are the set of groups who have access to a privilege policy in an account that the user's identity is also a member of;

determining whether to approve the request based on the analysis; and provisioning a JIT session with elevated privileges based on the determination.

79. A method, comprising:

analyzing a just-in-time (JIT) elevated privilege access request associated with a user including by using a plurality of factors associated with an impact of approving the request, wherein to analyze the request, the processor is configured to create an ensemble model which combines a plurality of inputs to the analysis to eliminate false positives;

determining whether to approve the request based on the analysis; and provisioning a JIT session with elevated privileges based on the determination.

80. A computer program product embodied in a non-transitory computer readable medium and comprising computer instructions for:

analyzing a just-in-time (JIT) elevated privilege access request associated with a user including by using a plurality of factors associated with an impact of approving the request, wherein to analyze the request, the processor is configured to create an ensemble model which combines a plurality of inputs to the analysis to eliminate false positives;

determining whether to approve the request based on the analysis; and provisioning a JIT session with elevated privileges based on the determination.

81. A method, comprising:

analyzing a just-in-time (JIT) elevated privilege access request associated with a user including by using a plurality of factors associated with an impact of approving the request, wherein to analyze the request, the processor is configured to build a probability model to assess whether a user's behavior is normal or anomalous and a confidence interval associated with the probability model's output, wherein the probability model is built using the plurality of factors associated with the impact of approving the request and through analyzing a sequence of events using context such as identity, group, policy, or account information as well as details such as time range, user identifiers, IP address, or geographical area to group the events;

determining whether to approve the request based on the analysis; and provisioning a JIT session with elevated privileges based on the determination.

82. A computer program product embodied in a non-transitory computer readable medium and comprising computer instructions for:

analyzing a just-in-time (JIT) elevated privilege access request associated with a user including by using a plurality of factors associated with an impact of approving the request, wherein to analyze the request, the processor is configured to build a probability model to assess whether a user's behavior is normal or anomalous and a confidence interval associated with the probability model's output, wherein the probability model is built using the plurality of factors associated with the impact of approving the request and through analyzing a sequence of events using context such as identity, group, policy, or account information as well as details such as time range, user identifiers, IP address, or geographical area to group the events;

determining whether to approve the request based on the analysis; and provisioning a JIT session with elevated privileges based on the determination.

* * * * *